Sept. 5, 1967　　　　　　M. A. MILLER　　　　　3,339,686
POTENTIOMETER DRIVE SYSTEM
Filed Nov. 5, 1965　　　　　　　　　　　　2 Sheets-Sheet 1
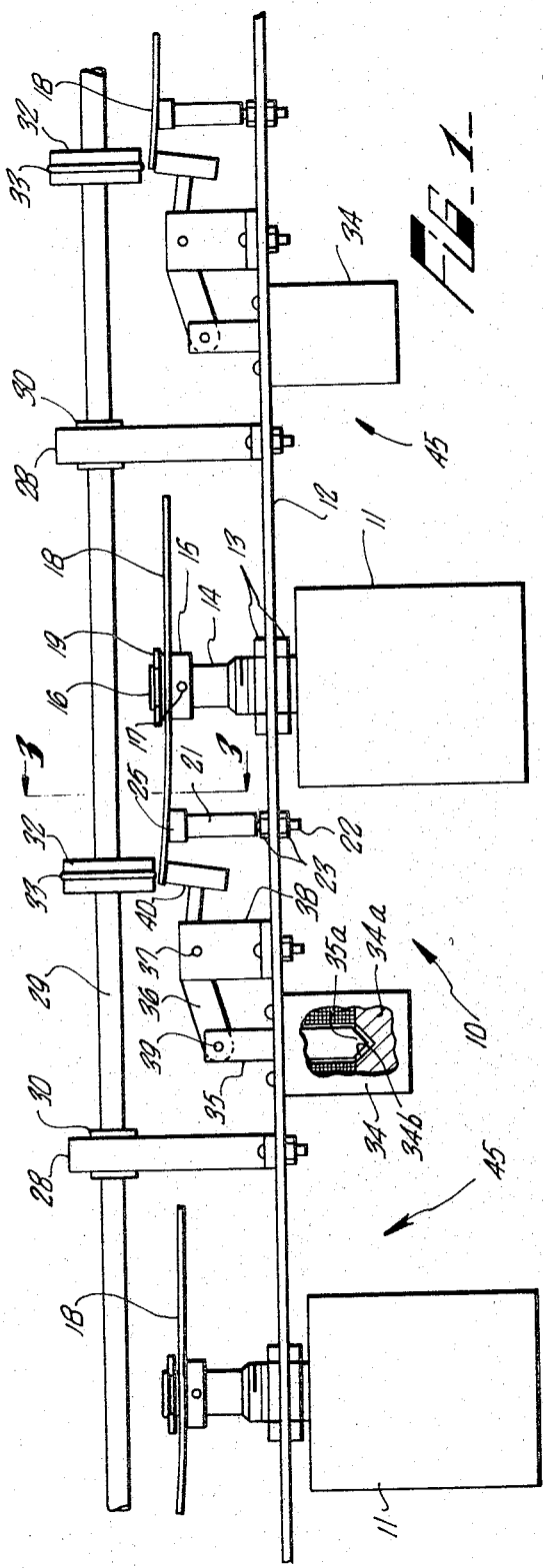
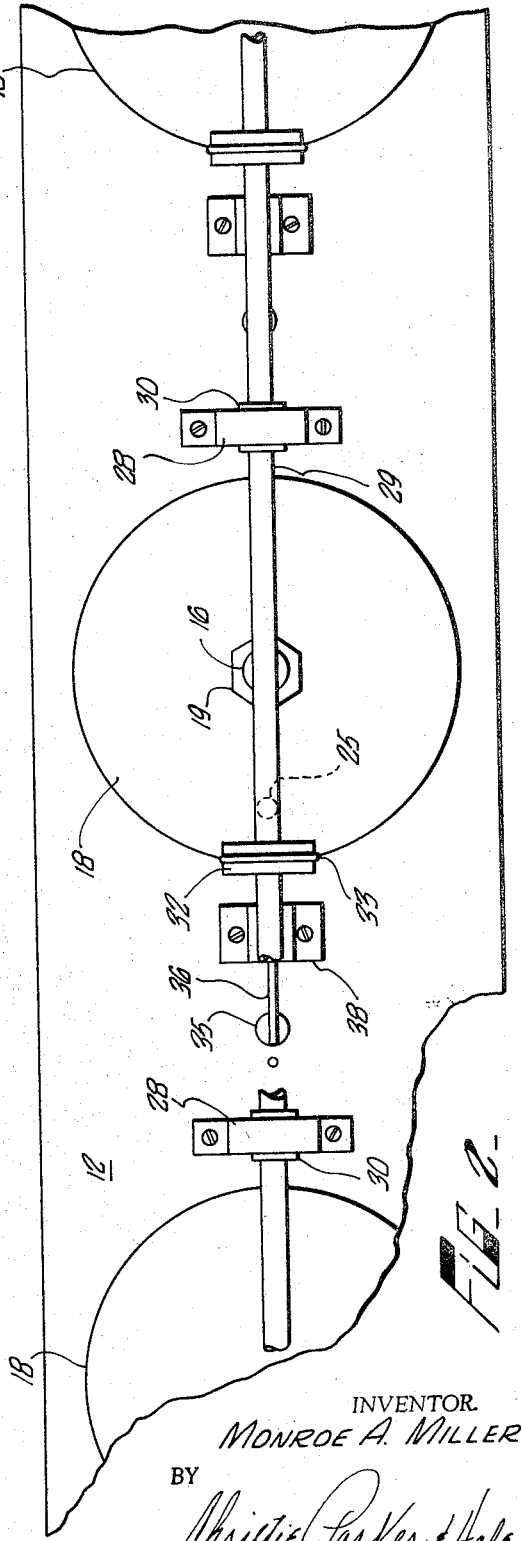
INVENTOR.
MONROE A. MILLER
BY
Christie, Parker & Hale
ATTORNEYS.

INVENTOR.
MONROE A. MILLER

United States Patent Office 3,339,686
Patented Sept. 5, 1967

3,339,686
POTENTIOMETER DRIVE SYSTEM
Monroe A. Miller, Coral Gables, Fla., assignor to Milgo Electronic Corporation, Miami, Fla., a corporation of Florida
Filed Nov. 5, 1965, Ser. No. 506,517
8 Claims. (Cl. 192—4)

ABSTRACT OF THE DISCLOSURE

The invention pertains to a driving mechanism wherein the creep of a shaft is minimized by the shaft being continuously subjected to a bending moment by an externally applied force.

---

This invention relates to a potentiometer drive system, and specifically to a drive system which minimizes creep or shift in the setting of a potentiometer which has been roated to a position providing a desired resistance value.

Potentiometers are well known in the electrical arts, and basically consist of an elongated resistance element and a wiper arm in contact with the element. The resistance appearing between the wiper arm and either end of resistance element is varied by moving the wiper arm along the element. When a voltage is applied to opposite ends of the element, a variable voltage will appear between the wiper arm and either end of the element, the magnitude of the variable voltage depending on the position or setting of the wiper arm along the element. The potentiometer is thus useful as a voltage divider and to perform other conventional electrical-circuit functions.

Many modern potentiometers are constructed with a wire resistance element wound around a frame or core. The wiper arm is secured to a shaft mounted in the center of the core. Rotation of the shaft sweeps the wiper arm across the wire windings.

Resolution of the potentiometer is increased by forming the core in a spiral or helix and arranging the wiper arm to move both in rotation and linearly along the axis of the helix so the wiper arm is swept over the windings along the entire length of the core. Such "multi-turn" potentiometers provide a broad range of adjustment with a relatively small resistance change for small changes in shaft angular position, and are useful in many circuits which require prceise, small-increment variations in circuit parameters.

It is desirable in many applications to provide an automatic drive system to rotate a potentiometer to a particular setting. Such a system typically includes a motor or other drive means for rotating the potentiometer, and a control circuit such as a servo system which senses the potentiometer setting and commands motor operation until a desired setting is achieved. Some systems further include a clutch or other disengageable connection means to permit the motor and potentiometer to be uncoupled when the desired adjustment is accomplished. Such an arrangement is essential when several potentiometers are individually adjusted by a single motor.

For example, in electronic systems such as analog computers, dozens of multi-turn potentiometers may be used as attenuators and to serve other functions where frequent readjustment is required. Such computers operate at high speeds, and automatic drive systems are required for setting the potentiometers if efficient operation is to be achieved. For economy and system simplicity, it is preferable to use a single motor and servo system to adjust a plurality of potentiometers, one at a time, in a selectable sequence. Each potentiometer is equipped with a clutch or other disengageable connection means so it can be separately coupled to the drive motor.

Unfortunately, such drive systems have in the past proved unsatisfactory in high-accuracy applications which require that a precisely established potentiometer setting remain undisturbed once that setting is achieved. It has been determined that the primary source of error arises from unwanted motion of the potentiometer shaft during or after uncoupling of the shaft from the drive motor. Such unwanted motion or "creep" of the shaft may be induced by the uncoupling action of the clutch, or may arise from the relaxation of axial or transverse forces which load the shaft when it is coupled to the motor.

The shaft may creep only a minute, almost-undiscernible amount during uncoupling, but still cause an intolerable error in final wiper position on the potentiometer winding. This can be viewed as an unfortunate consequence of the otherwise highly desirable characteristic of a high-resolution potentiometer that only a tiny change in shaft position is required to produce a finite change in potentiometer setting. The result of this hitherto unsolved problem has been a reversion to the use of one motor for each potentiometer used in high-accuracy systems, with a consequent increase in system cost and complexity, and a decrease in system reliability.

The potentiometer drive system of this invention overcomes the problem of post-adjustment creep, and permits the use of a single drive motor and servo system to adjust a plurality of potentiometers in a selectable sequence. The invention contemplates the continuous application of a force to the potentiometer shaft in a direction transverse the shaft axis of rotation. The bending moment thus induced prevents unloading of the shaft when the clutch is disengaged, preserving the desired setting established before disengagement. The continuous transverse loading also serves to prevent shifts in potentiometer position due to moderate amounts of mechanical shock and vibration.

Briefly stated, the potentiometer drive system includes a potentiometer having a rotatable shaft, and drive means engageable with the shaft for rotating the shaft to adjust the potentiometer. Means are provided for applying a force to the shaft in a direction transverse to the shaft axis of rotation whereby the shaft is at all times subjected to a bending moment.

In a preferred form of the invention, the bending moment is applied to the potentiometer shaft by a compliant disc secured to the end of the shaft and extending laterally therefrom. A post bears against the disc and displaces a portion of the disc in a direction transverse its major plane. A component of this bending force is transmitted to the potentiometer shaft through the disc. Preferably, engaging means are provided to lift the disc off the post and into engagement with the drive means to rotate the potentiometer shaft to a desired position.

The invention will be described with reference to the attached drawings in which:

FIG. 2 is a top view, partly broken away, of the system shown in FIG. 1;

FIG. 3 is an enlarged view along line 3—3 of FIG. 1, with the drive system actuated to rotate the potentiometer.

Figure 1:
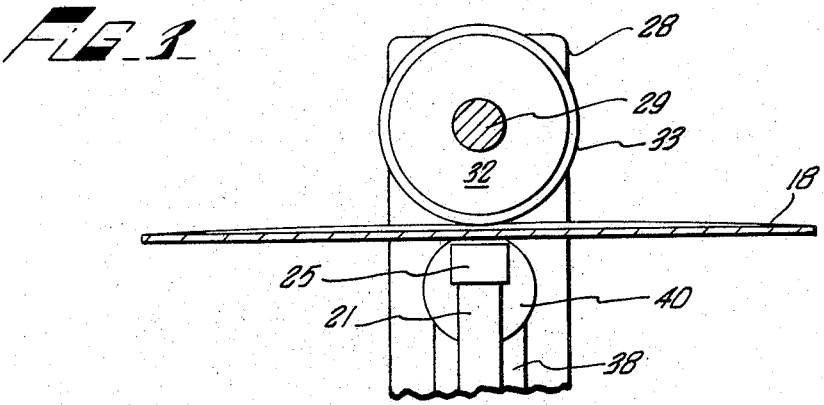
FIG. 1 is an elevation, partly broken away, of a potentiometer drive system according to the invention.

Referring to FIGS. 1 and 2, a potentiometer drive system 10 of this invention includes a potentiometer 11 positioned below a frame 12 (such as a conventional electronic chassis), and secured to the frame by a pair of nuts 13. The potentiometer has a shaft 14 which extends upwardly through the frame. A collar 15 having a hollow externally threaded extension 16 is secured by a set screw 17 to the shaft between the top of the frame and the end of the shaft.

A round disc 18 having a centered hole is slipped over the shaft and threaded extension 16 to rest on the collar. A nut 19 is threaded on the threaded extension to secure the disc against the collar. The disc is formed from a flat sheet of a springy, compliant material such as Phosphor bronze or spring-tempered stainless steel. The disc is relatively thin, say 0.008 inch, so it may be bent or deflected from its normally flat position by a relatively small force The major plane of the undeflected disc is substantially perpendicular to the axis of the potentiometer shaft, and substantially parallel to the frame.

An elongated stud or post 21 having a threaded lower end 22 is secured to the frame by a pair of nuts 23. The post is spaced from and parallel to the potentiometer shaft, and extends upwardly from the frame toward the bottom of the disc. A rubber or plastic tip 25 is secured to the top of the post. The height of the post above the frame is adjusted so the tip contacts and upwardly deflects a portion of the compliant disc. The restoring force exerted by the disc is transmitted to the potentiometer shaft and induces a cocking or bending moment in the shaft.

A pair of bearing support brackets 28 are secured to the top of the frame on opposite sides of the disc. A rotatable drive shaft 29 is journalled through a pair of bearings 30 secured in the support brackets. The support brackets are positioned so the shaft is parallel to the frame and extends above the post and potentiometer shaft. That is, the longitudinal axes of the drive shaft, post and potentiometer shaft are coplanar.

Secured to the drive shaft is a drive wheel 32. Preferably, the drive wheel includes a plastic or rubber O-ring 33 disposed in a groove around the periphery of the drive wheel. The drive wheel is positioned on the drive shaft to be spaced from the potentiometer shaft outboard of post 21 just above the outer top surface of the disc. The diameters of the drive wheel and O-ring are selected so the O-ring is just out of contact with the disc surface as deflected by the post.

A solenoid 34 is secured to the bottom of the frame, and includes a movable plunger 35 extending upwardly through an opening in the frame. Preferably, the portion of the plunger extending into the solenoid has a cone-shaped end 35a, and the solenoid includes a pole piece 34a having a cone-shaped cavity 34b. When the solenoid is energized, the plunger is drawn toward the pole piece and end 35a seats in cavity 34b. This arrangement concentrates the magnetic field in the solenoid at the conical end of the plunger, generating a large pulling force toward the end of the plunger travel.

A link 36 is pivotally mounted by a pivot pin 37 to a support bracket 38 which is secured to the top of the frame. One end of the link is pivotally secured to the end of the plunger by a pivot pin 39. A roller 40 is rotatably mounted on the other end of the link. The roller is positioned adjacent the post below the disc and drive wheel 32. When the solenoid is not energized, the roller may rest lightly on the bottom of the disc, or may be spaced slightly from the disc.

In operation, the solenoid is electrically energized to urge the plunger into the solenoid. The end of link 36 secured to the plunger is thus drawn downwardly toward the frame. The link pivots about pin 37, raising roller 40 upwardly away from the frame against the disc. As shown in FIG. 3, the disc is thereby further deflected to be lifted off the post into contact with O-ring 33 on the drive wheel.

A motor (not shown) secured to the drive shaft is then actuated to rotate the shaft and drive wheel. The frictional engagement of the O-ring and disc causes the disc to rotate with the drive wheel, and the shaft position of the potentiometer is thereby varied. When the potentiometer shaft has been driven to a desired position, solenoid 34 is de-energized to lower roller 40, disengaging the disc and drive-wheel O-ring, and lowering the disc back into the post.

The disc is at all times unidirectionally deflected by either the post or the roller, and a cocking force or bending moment is therefore at all times induced in the potentiometer shaft. I have found that this bending moment reduces or eliminates any tendency for the shaft to change position during or after disengagement of the disc and drive wheel. Once the shaft is set to a desired position, it is thus maintained in that position without creep or shift which would otherwise be introduced by the complete relaxation of forces acting on the potentiometer shaft.

The potentiometer drive system is particularly suited to applications requiring periodic individual adjustment of a plurality of potentiometers. For example, additional systems 45 (each having a potentiometer, disc, post, solenoid, link and roller as just described), as shown in FIG. 1, may be secured to the frame in alignment with the drive shaft on either side of the potentiometer drive system 10. The solenoid of each system may be individually energized by suitable control means, permitting a single drive motor and shaft to be used for individual adjustment of all the potentiometers.

Figure 4:
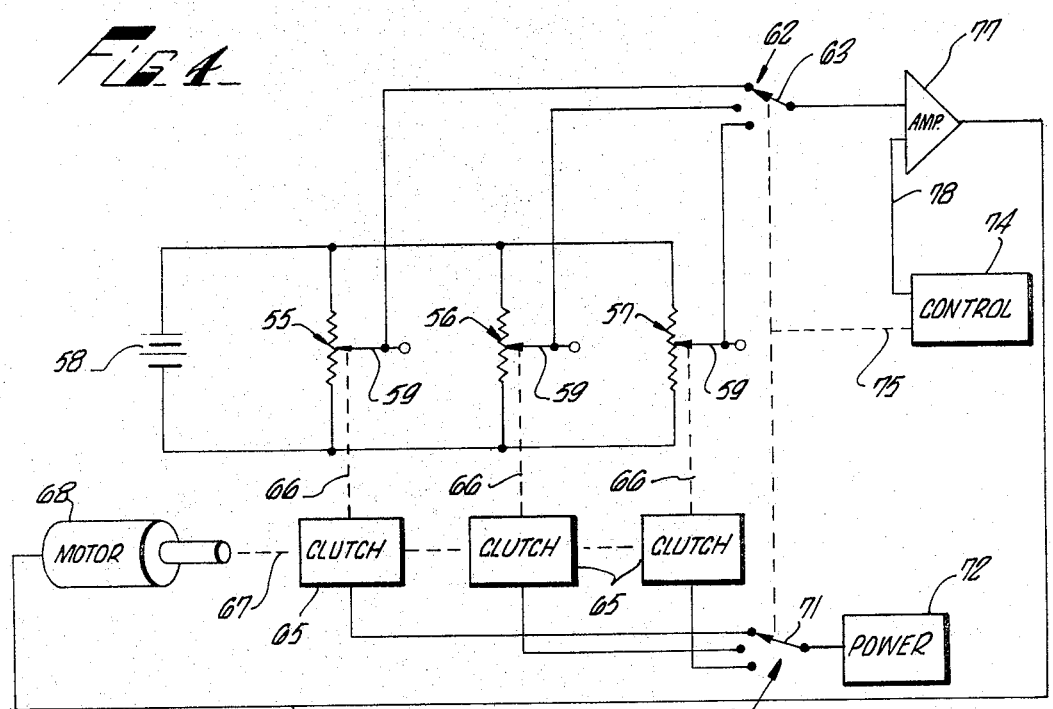
FIG. 4 is a block-diagram schematic of a multi-potentiometer drive system and associated control circuitry.

A typical circuit for controlling the adjustment of a plurality of potentiometers is shown in FIG. 4. Three potentiometers 55, 56 and 57 are connected in parallel across a battery 58 or other voltage source. The potentiometers have wiper arms 59 which are electrically connected to respective terminals on a three-position switch 62 having an arm 63.

The solenoid, roller, drive wheel and other mechanical clutch or engaging apparatus associated with each potentiometer as already described are represented by "clutch" blocks 65 coupled to a disc on each respective potentiometer shaft as schematically indicated by dotted line 66. Each solenoid is electrically connected to a respective terminal of a three-position switch 70 having an arm 71 connected to a power source 72. A drive shaft as already described is schematically represented by dotted line 67 coupled to a drive motor 68 and to each respective "clutch" block 65.

A control circuit 74, which may be of a conventional type, is adapted to actuate switches 62 and 70 as indicated by dotted line 75. These switches may of course be electro-mechanical relays, or any other conventional switching means. Arm 63 of switch 62 is connected to one input of a conventional servo-amplifier 77. Control circuit 74 has an output connected by a line 78 to a second input of the servo amplifier. This control-circuit output provides a "target" voltage analogous to the desired wiper-arm voltage of the potentiometer to be adjusted. The output of the servo-amplifier is connected by a line 79 to drive motor 68.

The control circuit is typically programmed for operation from magnetic or punched tape, or other conventional storage means. Values analogous to desired potentiometer settings are fed from the storage means to the control circuit which in turn provides an analogous target voltage to the servo amplifier.

With switches 62 and 70 set as shown in FIG. 4, the wiper-arm voltage from potentiometer 55 is fed through switch 62 to the servo-amplifier. The solenoid associated with potentiometer 55 is energized through switch 70 by power source 72 to engage the disc of this potentiometer with its respective drive wheel on the drive shaft. As long as the target voltage and wiper-arm voltage are unequal, the servo-amplifier actuates drive motor 68, rotating the drive shaft and drive wheel to vary the potentiometer setting. When the target voltage and wiper-arm voltage are identical, the servo-amplifier output drops to zero and stops the rotation of the shaft.

Switches 62 and 70 may then be actuated by the control circuit to connect the wiper arm of potentiometer 56 to the servo amplifier, and to energize the solenoid associated with that potentiometer. Potentiometer 55 and its associated solenoid are thereby disconnected from the servo-amplifier and power source, and potentiometer 56 is then adjusted in the manner just described. Similarly, potentiometer 57 may be selected by the control circuit for adjustment. Although three potentiometers have been shown in FIG. 4, the potentiometer drive system of this invention is of course suitable to adjust any reasonable number of potentiometers by using a single drive motor and servo-system.

While the invention has been described in terms of a specific configuration including a post and compliant disc to induce a bending moment in a potentiometer shaft, the invention is not limited to this particular form of apparatus. Other mechanical arrangements may be employed to induce a bending moment in the potentiometer shaft, and it is intended that such arrangements be within the scope of the appended claims.

I claim:

1. A potentiometer drive system, comprising: a potentiometer having a rotatable shaft; means engageable with the shaft for rotating the shaft to adjust the potentiometer; and means for applying a force to the shaft in a direction transverse to the shaft axis of rotation whereby the shaft is at all times subjected to a bending moment tending to prevent unwanted creep of the shaft after it is rotated to a desired position.

2. A potentiometer drive system, comprising: a potentiometer having a rotatable shaft; a compliant disc secured to the shaft, the disc having a major plane which is substantially perpendicular to the axis of the shaft; means spaced apart from the shaft and bearing against the disc for displacing a portion of the disc in a direction transverse to its major plane whereby a bending moment is induced in the shaft, the bending moment tending to prevent unwanted creep of the shaft after it is rotated to a desired position; and drive means engageable with the disc for rotating the disc whereby the shaft can be set to a desired position.

3. A potentiometer drive system, comprising: a frame; a potentiometer secured to the frame and having a shaft; a normally flat, compliant disc secured to and extending transversely from the shaft; a post secured to the frame and bearing against a face of the disc to bend a portion of the disc in a direction transverse its major plane whereby a bending moment is induced in the shaft; and drive means secured to the frame and engageable with the disc for rotating the disc whereby the shaft can be set to a desired position.

4. A potentiometer drive system, comprising: a frame; a potentiometer secured to the frame and having a shaft; a normally flat, compliant disc secured to and extending transversely from the shaft; a post secured to the frame and bearing against a face of the disc to bend a portion of the disc in a first direction transverse its major plane; drive means secured to the frame adjacent and normally spaced apart from the disc; and engaging means secured to the frame for separating the post and disc whereby the disc contacts the drive means to be rotated thereby; the engaging means being positioned to bend a portion of the disc in substantially the first direction as the disc is rotated.

5. A potentiometer drive system, comprising: a frame; a potentiometer secured to the frame and having a shaft; a normally flat, compliant disc secured to and extending transversely from the shaft, the disc having opposed first and second faces; a post secured to the frame and bearing against the first face of the disc to bend a portion of the disc in a direction transverse its major plane; drive means for rotating the disc, the drive means being secured to the frame and positioned adjacent and normally out of contact with the second face of the disc; and lifting means secured to the frame adjacent the post for lifting the disc out of contact with the post and moving the second face of the disc into engagement with the drive means.

6. A potentiometer drive system, comprising: a frame; a potentiometer secured to the frame and having a shaft; a normally flat, compliant disc secured to and extending transversely from the shaft, the disc having opposed first and second faces; a post secured to the frame and bearing against the first face of the disc to bend a portion of the disc in a direction transverse its major plane; a motor secured to the frame; a drive shaft coupled to the motor and extending generally parallel to the disc over the second face; a drive wheel secured to the shaft to rotate therewith, the rim of the wheel being disposed slightly above and normally out of engagement with the second face, the rim being spaced apart from the axis of the shaft; a roller pivotally secured to the frame and disposed adjacent the post and adjacent the first face opposite the drive wheel; solenoid means secured to the frame and coupled to the roller for selectably moving the roller against the first face whereby the compliant disc is lifted away from the post and urged against the drive-wheel rim, the disc thereby being driven by the drive wheel to rotate the potentiometer shaft.

7. A potentiometer drive system comprising: a frame; rotatable drive means secured to the frame; and a plurality of potentiometer assemblies disposed adjacent the drive means, each potentiometer assembly including a potentiometer secured to the frame and having a shaft, a compliant disc secured to and extending transversely from the shaft, a post secured to the frame and bearing against the disc to bend a portion of the disc in a direction transverse its major plane, and engaging means for moving the disc out of contact with the post and into engagement with the drive means whereby the disc is rotated to vary the potentiometer shaft position.

8. A potentiometer drive system as defined in claim 7 and further comprising electrical control means connected to the engaging means in each of the several potentiometer assemblies for selectively commanding actuation of individual engaging means whereby the shaft position of each potentiometer is individually varied.

References Cited

UNITED STATES PATENTS

| 2,585,830 | 2/1952 | Perruca | 74—209 |
| 2,942,488 | 6/1960 | Faulkner | 74—208 |
| 3,111,252 | 11/1963 | Levene | 226—187 |

CARLTON R. CROYLE, *Primary Examiner.*

ARTHUR T. McKEON, *Examiner.*